United States Patent [19]

Himelstein et al.

[11] Patent Number: 4,745,405
[45] Date of Patent: May 17, 1988

[54] OBJECT MOVEMENT FEEDBACK

[75] Inventors: Carol S. Himelstein; John S. Wang, both of Austin, Tex.

[73] Assignee: International Business Machines Corporation, Armonk, N.Y.

[21] Appl. No.: 646,382

[22] Filed: Aug. 31, 1984

[51] Int. Cl.⁴ .............................................. G09G 1/16
[52] U.S. Cl. .................. 340/709; 340/724; 340/727
[58] Field of Search ............... 340/701, 724, 725, 726, 340/727, 723, 707, 721; 364/171, 188, 189, 190, 200 MS File, 900 MS File, 561

[56] References Cited

U.S. PATENT DOCUMENTS

| | | | |
|---|---|---|---|
| 3,887,903 | 6/1975 | Martell | 364/200 |
| 4,181,952 | 1/1980 | Casey et al. | 364/561 |
| 4,247,843 | 1/1981 | Miller et al. | 340/721 |
| 4,451,895 | 5/1984 | Sliwkowski | 340/707 |
| 4,504,918 | 3/1985 | Axemann | 340/725 |
| 4,556,957 | 12/1985 | Ichikawa | 364/171 |

OTHER PUBLICATIONS

Koehler, Carol, "MacPaint", Apple Computer Corp., 1983.
LiseDraw TM Reference Manual, Apple Computer Corp., 1983, pp. 134, 138, 150, 151.
MacDraw TM Reference Manual, Apple Computer Corp., 1984, pp. 32, 36, 50, 51.

Primary Examiner—Marshall M. Curtis
Attorney, Agent, or Firm—J. H. Barksdale, Jr.; H. St. Julian

[57] ABSTRACT

A method of, and system for, accurately manipulating objects on a screen to obtain a desired layout. Objects are called or built and then manipulated in terms of rotation and/or displacement. Accurate manipulation is facilitated by displaying a readout of the extent of rotation and/or displacement. Upon obtaining a desired layout, the layout is stored, printed, used to drive a process, etc.

8 Claims, 4 Drawing Sheets

OBJECT TRANSLATION

OBJECT ROTATION

OBJECT MOVEMENT FEEDBACK

DESCRIPTION

1. Technical Field

This invention relates generally to display screen building, and more specifically to precisely positioning an object on the screen to obtain a desired screen layout.

2. Background Art

Movement related readings and readouts are included in our everyday activities. One of the most common is the reading on an automobile odometer based on a travelled distance. The odometer is commonly clustered with other instruments on an instrument panel. In addition, instrument panels have been reflected off of windshields in order for the road and readings to be viewed through the same view port. Here the viewport is the windshield. However, an automobile driver is not able to directly view movement of the automobile. Only relative movement is viewable.

In another arena, verniers (scales or gauges) have been used to measure movement of rotatable shafts and linearly moveable objects. Here, both a reading and movement are viewable within the same general line of sight.

The arena of the present invention is a readout of movement of a representation of an object during the building of a display screen for storage, printing, process control, etc. During the building of a screen, objects can be called or built, and then moved on the screen to a desired position. The objects can be strings of text, squares, circles, floor plans, etc., or portions thereof. Movement of an object on the screen can be in place, such as rotation of a pie chart, or linear such as movement of a picture frame relative to other depicted room furnishings. In many instances, precise positioning is not critical. However, in those instances where positioning is critical, a movement readout would be very advantageous. Also advantageous would be movement and readout within the same line of sight or viewport. An example of where positioning of objects on a screen is critical is where the ultimately built screen will be used to drive a robotic manufacturing process such as populating a circuit board with components. A fraction of a millimeter can mean either proper population or crushed pins. Of course, an operator or a user can keyboard in circuit board and component pinhole coordinates. However, this takes away from the attractive ease of use feature of mouse graphics. That is, keying in coordinates is both time consuming and tedious, whereas movement of an object on a screen by means of a mouse is somewhat effortless and natural.

Based on the above, both object movement and a movement related reading or readout are old and well known, and pertinent to varying degrees. However, this prior art falls short of either anticipating the instant invention or rendering the instant invention obvious.

The instant invention presents an advance over known prior art in that a representation of an object can be moved on the same screen that a readout of the extent of movement is presented. In addition, the readout is tied to the object rather than occupying a dedicated piece of screen real estate. That is, the readout changes with movement of the object, and changes location with movement of the object. The advantages of these advances are that objects can be accurately positioned, a screen can be built in a very short period of time, and operator confusion and distraction are reduced.

DISCLOSURE OF THE INVENTION

A unique method of, and system for, accurately positioning an object on a screen are provided in order to obtain a desired layout. Object representations are called or built and moved relative to one another and/or the screen itself. Positioning of an object is accurately attained by selecting the object, causing a selector such as a cursor to be displayed attached to the object, and causing a readout to appear adjacent the selector for providing an operator with an indication of the extent of movement of the object on the screen.

BEST MODE FOR CARRYING OUT THE INVENTION

Generalized Description, Background Information, and Definitions

Figure 1:
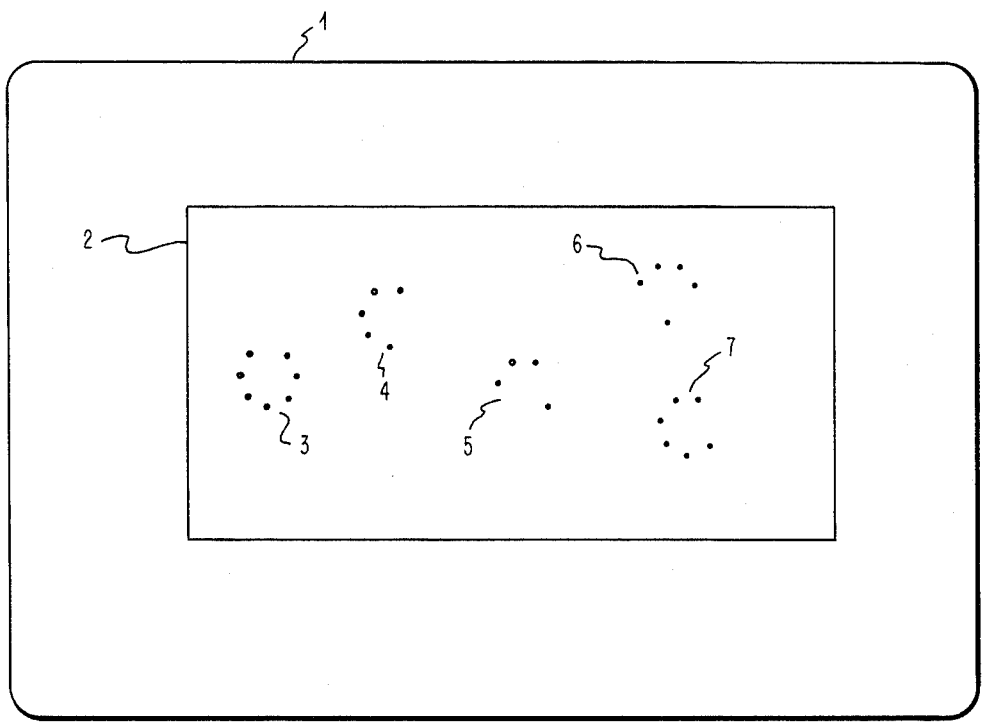
FIG. 1 illustrates a screen having a circuit board representation displayed thereon.

Actual circuit board population today is an automated operation involving robots, conveyors, etc. However, the setup of this operation is often not that automated, and further upstream, the layout or design of a populated board requires much human input. The portion of the entire process to which this invention is applicable, as an example, is one where the board and the components are already determined. With the board already known, a representation thereof can be stored in a symbol table or memory, and called when desired. The same can be the case for the components.

A designer or operator utilizing a device controlled standalone or host connected computer work station or system first calls the circuit board. Calling can be by means of keying on a keyboard device. Upon calling, the circuit board will be displayed on a cathode ray tube display screen included in the system. For purposes of brevity, it will be assumed that positioning and orienting the board relative to a work table have already been determined, and as such, operator positioning of the board on the screen will not be considered.

Next, the designer will call a component. Assume the component is cylindrical in shape with an asymmetrical arrangement of downwardly extending pins. Assume also that the called component will be oriented on the screen in the same manner as received by the robot which will place the component on the board. Further, assume that the orientation of the pin openings in the board for the component do not match the called component pin orientation, and that the component when called is displayed off of the board. Under the above circumstances, the component must be moved or repositioned in terms of both rotation and translation. Before the component can be moved, it must be selected. Selection is under mouse device control. A pointing cursor is placed coincident with the component through movement of the mouse, and then a select button on the mouse is depressed for selecting the component.

If thereafter a translation mode is selected through border icon selection, or translation routine calling upon keyboarding, movement of the mouse will result in translation of the component. The extent of movement will be displayed as a readout adjacent the cursor. This extent will also be stored upon final positioning for later robot control. When the component is positioned over the pin openings, a rotate mode is selected by icon selection, or routine calling upon keyboarding. The extent of rotation of the component will be determined by movement of the mouse. During rotation of the component to align the pins, the degrees of rotation will be displayed as a readout adjacent the cursor. In the above, not only will object movement, and an extent of movement readout, be viewable by an operator on the same screen, but the readout will be presented adjacent or within the object being moved. This will eliminate viewing different portions of the screen and the resulting confusion and distraction.

Although a mouse is described herein, other hand controlled and moveable devices such as joy sticks, scratch pads, track balls, etc. could be used.

In the above, movement is meant to include both rotation and displacement or translation of an object. Positioning an object includes moving the object. Displacement or translation of an object can be along any straight, curved, angular, etc. path traverseable by a mouse. During translation or displacement, the rotational orientation of the object will remain the same. During rotation of the object, there will be no translation or displacement. Of course, operation in both a translation and a rotate mode at the same time is possible with separate readouts in both centimeters and degrees adjacent the object.

DETAILED DESCRIPTION

For a more detailed understanding of the invention, reference is first made to FIG. 1.

In this figure is illustrated a display screen 1 having displayed thereon a circuit board representation 2. A plurality of pin opening configurations 3-7 are depicted on board 2. The pin openings are represented by dots and are for accepting pins of components which are to populate an actual board.

Figure 2:
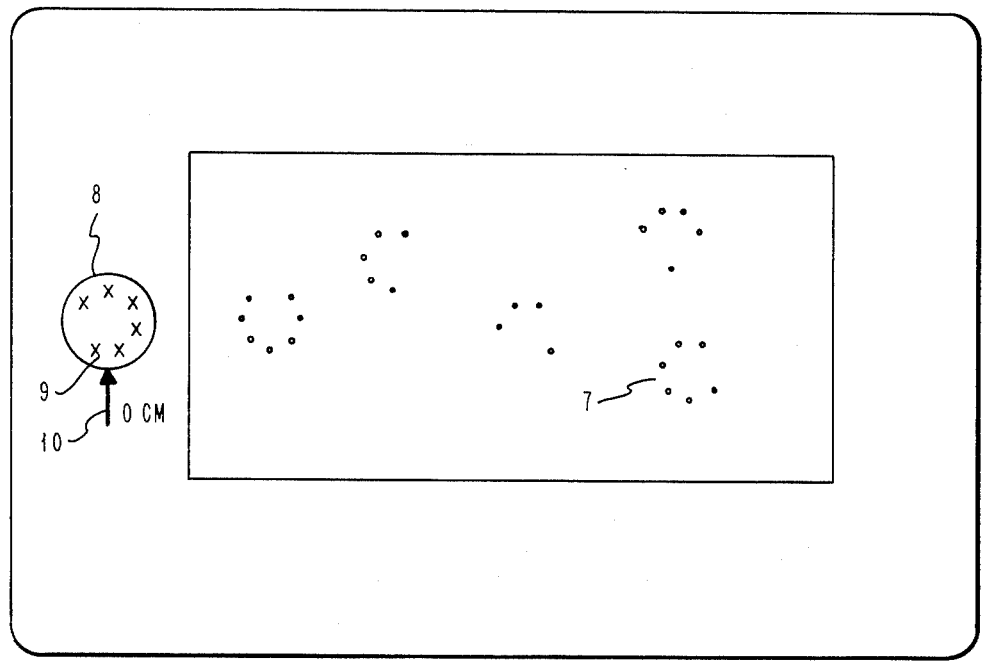
FIG. 2 illustrates the layout of FIG. 1 along with a called component.

Refer next to FIG. 2. In addition to FIG. 1, there is illustrated a component 8 having a pin configuration 9. The pins are represented by x's. When component 8 is called, it is to be assumed that it will be displayed in the orientation and position shown, and that the position and orientation correspond to receipt of the component by a robot which will actually populate a board.

With component 8 located as shown, it is to be assumed that pins 9 are to be positioned in pin openings 7. Openings 7 are located to the right and down from component 8. Also, openings 7 are oriented at a different angle than pins 9. As such, component 8 must be both translated and rotated.

In order to move component 8 from the position shown to the location of openings 7, the designer first selects the object or component 8 through mouse select button depression. Following selection, a translation mode is selected. This can be through keyboarding, icon selection, etc.

Normally, when an object is selected, selection of a translation mode is not required. The reason is that selection ties the object to the mouse, and movement of the mouse will cause movement of the object. However, with the instant invention a readout is required. Mode selection determines both the type of readout and that there will be a readout.

Referring again to FIG. 2, it is to now be assumed that the mouse has been moved, pointing cursor 10 has been brought coincident with component 8, component 8 has been selected, and a translation mode has been selected. This will result in a numerical readout of 0 cm. adjacent cursor 10. During movement of component 8 under mouse control, the readout will follow cursor 10 and be updated to the extent of movement of component 8.

Figure 3:
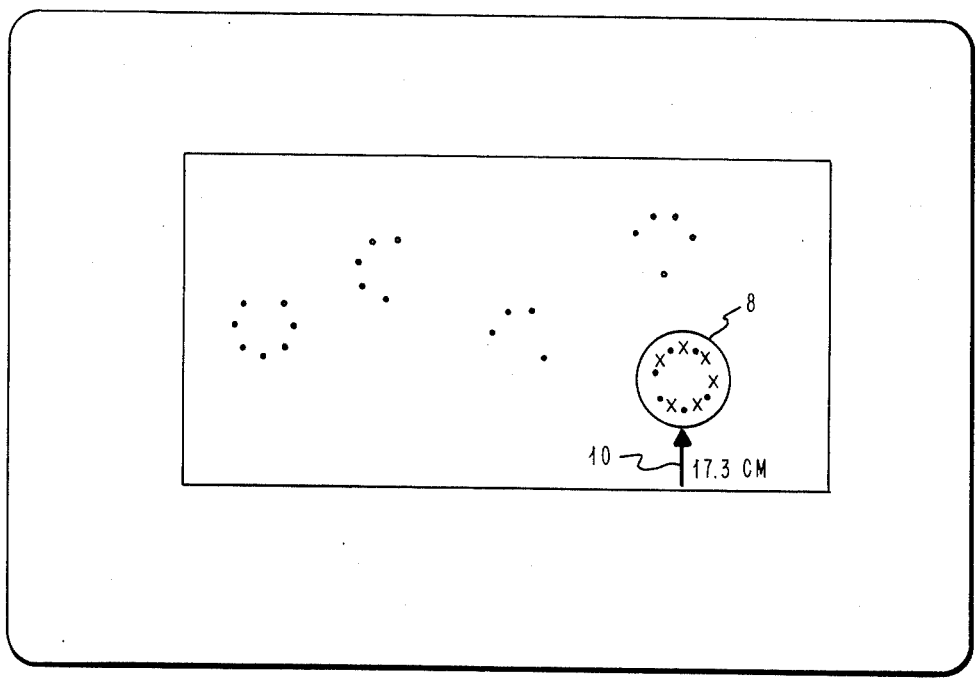
FIG. 3 illustrates a readout following displacement or repositioning of the component on the board relative to pin openings in the board.
Figure 4:
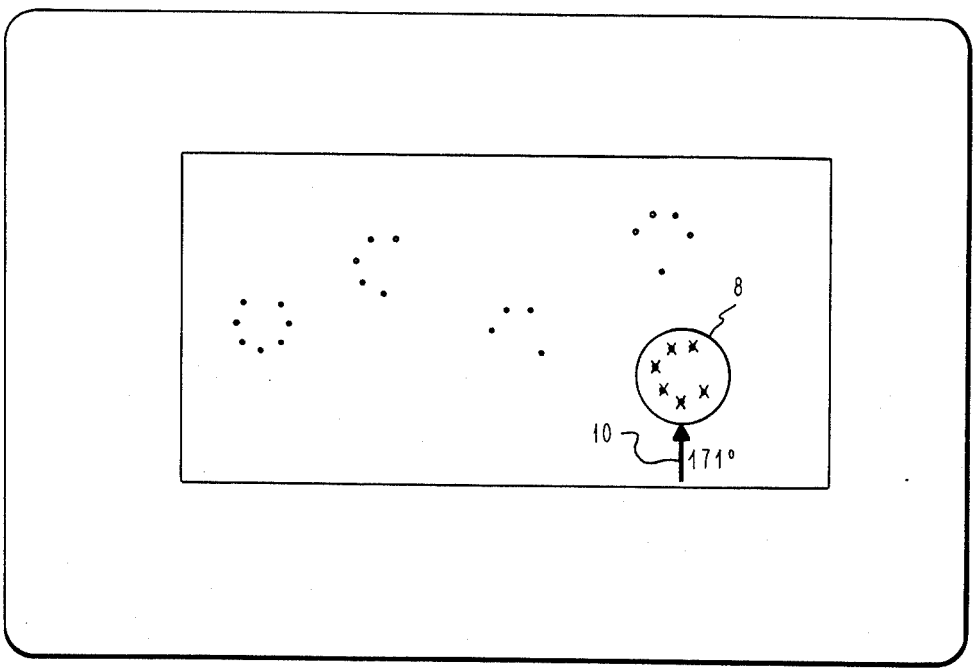
FIG. 4 illustrates a readout of rotation of the component for properly aligning component pins with corresponding board pin openings.

Referring next to FIG. 3, when component 8 has been moved to the position shown, the numerical readout will read 17.3 cm. (assuming this corresponds to the extent of movement). At this time, a mode change is in order due to pins 9 and openings 7 not matching. A rotation mode is selected. At the time of selection, a numerical readout of 0° will be displayed adjacent cursor 10. As component 8 is rotated to align pins 9 and openings 7, the readout will dynamically change accordingly. When pins 9 and openings 7 are aligned as shown in FIG. 4, a numerical readout of 171° (assuming this corresponds to the extent of rotation) will be displayed adjacent cursor 10.

The advantages of the readout are many and apparent. For example, the readout can aid in precise positioning, and can be printed out along with the remainder of the screen to form a record. In addition, one reviewing a screen layout including, for example, a pie chart, may request a 180° rotation. With the instant invention, not only is rotation readily attainable, but the exact extent of rotation is readily attainable.

Figure 5:
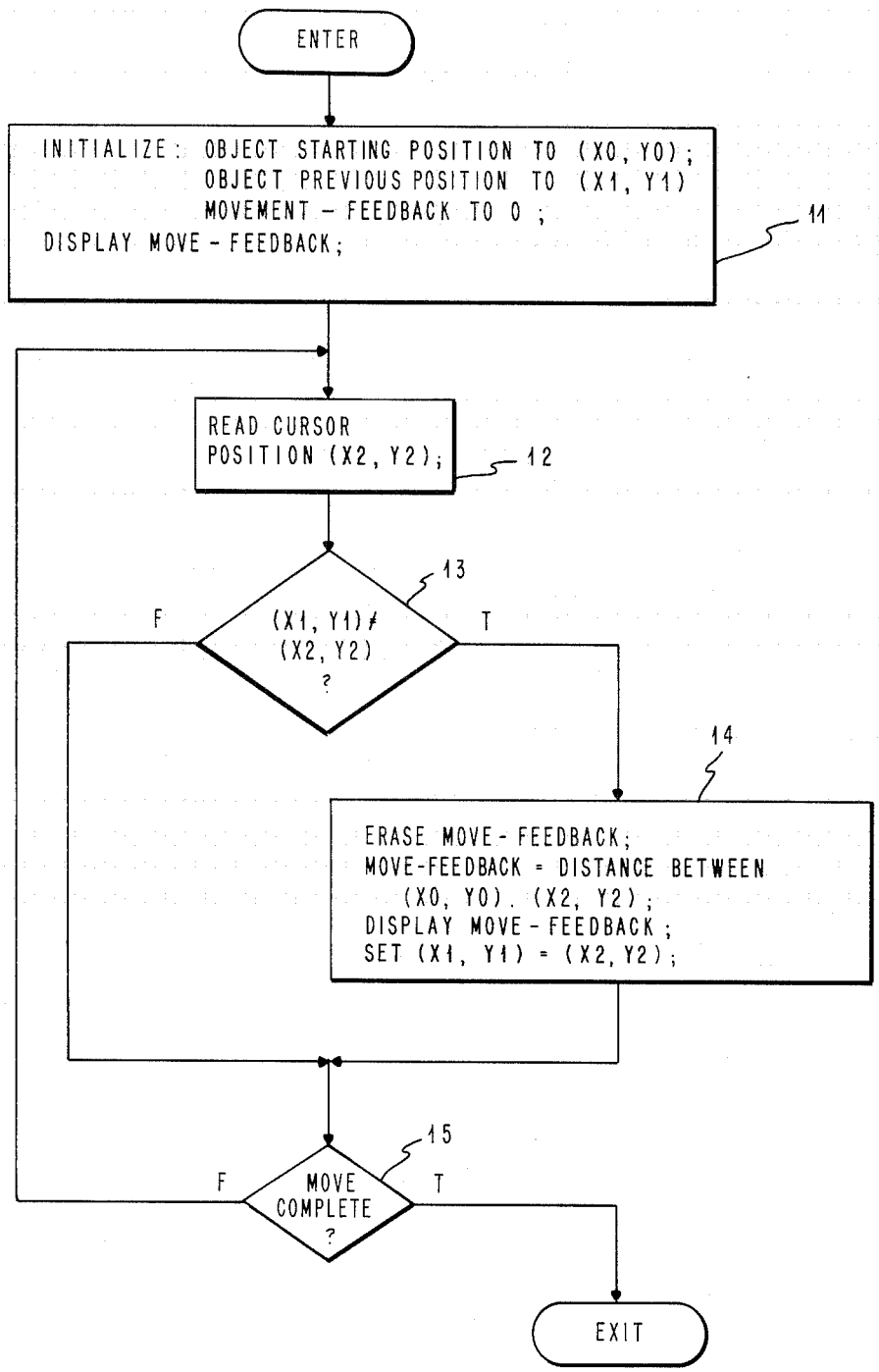
FIG. 5 is a flow chart illustrating operator and system operations performed in displacing an object according to the instant invention.

Reference is next made to the flow chart of FIG. 5 which illustrates operator and system operations for displacing an object from one position to another.

As indicated by block 11, variables are initialized for later use. "(X0,Y0)" is the coordinate value for the starting position of the pointing cursor. "(X1,Y1)" defines the coordinate position of the pointing cursor before the next move. "Movement-feedback" is the amount of accumulated movement.

As indicated by block 12, the current cursor position is read and assigned to "(X2,Y2)". In block 13 a determination is made as to whether there has been any movement of the cursor. If there has been movement, then control proceeds to block 14.

In block 14, the old movement-feedback data is erased from the screen, recalculated and redisplayed next to the current location of the cursor. "(X1,Y1)" are then assigned the value of "(X2,Y2)".

Thereafter, or if there had been no movement determined by block 13, control passes to block 15. At this point, a determination is made as to whether the operator wishes to terminate the translation process. This could be by any suitable means. If the operator had not terminated translation, control reverts to block 12. Otherwise the routine is terminated.

Figure 6:
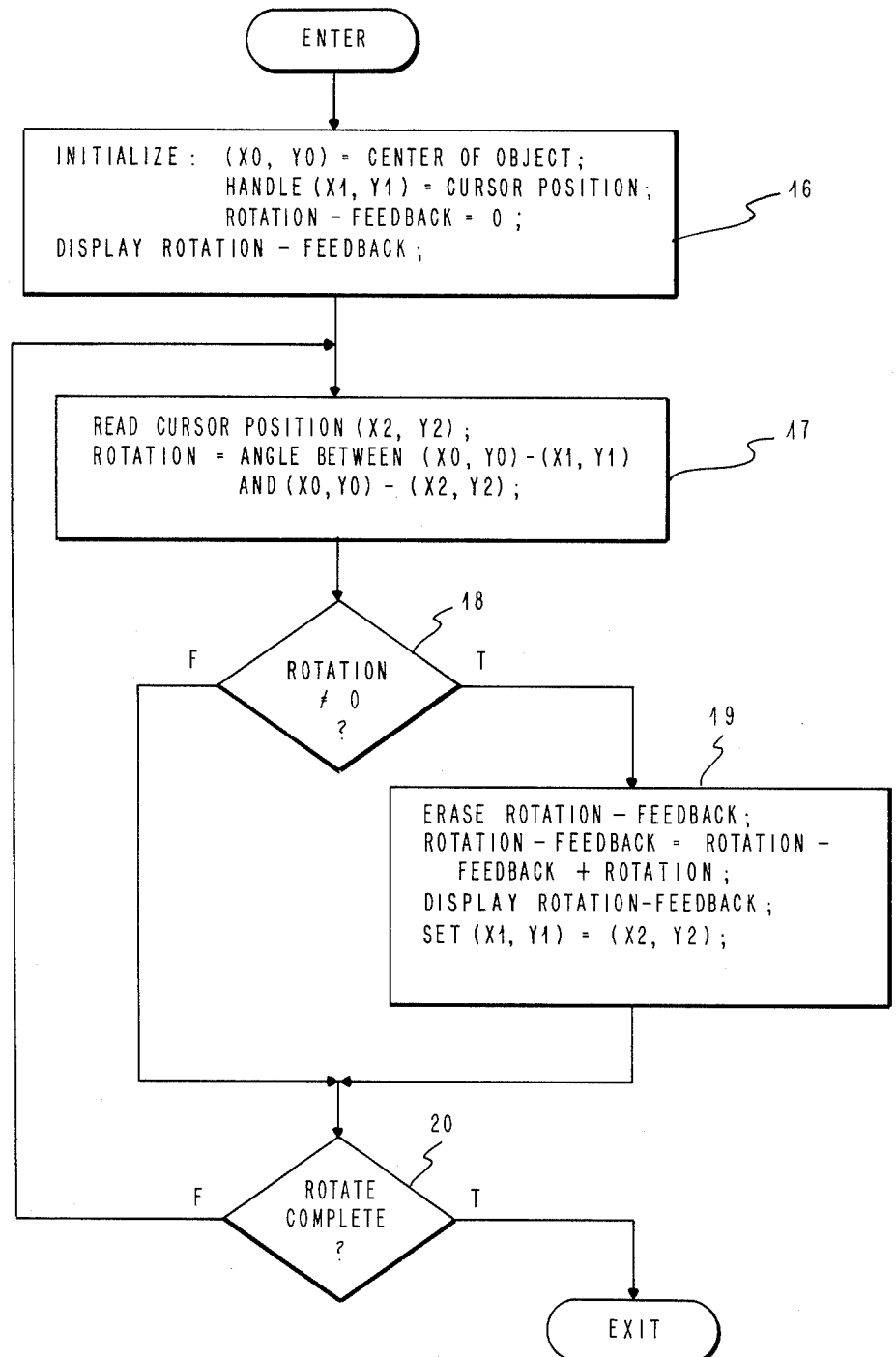
FIG. 6 is a flow chart illustrating operator and system operations performed in rotating an object in place according to the instant invention.

Reference is next made to the flow chart of FIG. 6 which illustrates operation and system operations for rotating an object in place. As indicated by block 16, variables are initialized for later use. "(X0,Y0)" is the coordinate value for the starting position of the pointing cursor. "(X1,Y1)" defines the coordinate position of the pointing cursor before the next detectable movement of the cursor. "Rotation-feedback" is the amount of accumulated rotation.

As indicated by block 17, the current cursor position is read into "(X2,Y2)" and a calculation of the amount of rotation is made.

In block 18 a determination is made as to whether there has been any rotation based on the calculation in block 17. If there was rotation, then control proceeds to block 19. In block 19, the old "Rotation-feedback" value is erased from the screen, recalculated and redisplayed next to the pointing cursor. "(X1,Y1)" are then set to the value of "(X2,Y2)".

Upon leaving block 19, or if there had been no detection of rotation by block 18, control passes to block 20. At this point, a determination is made as to whether the operator wishes to terminate the rotation process. This can be by any suitable means such as button depression or release, keyboarding, etc. If the operator is not ready to terminate, then control reverts to block 17. Otherwise, the routine is terminated.

Set out below are illustrations of routines or applications useable by the workstation for permitting movement (translation and rotation) of an object and causing a readout of the extent of movement during movement. These routines can be combined and packaged as a single application program. These routines are in program design language from which source and object code are derivable.

Object Translation
---
INITIALIZE THE OBJECT STARTING POSITION TO (X0,Y0);
INITIALIZE THE OBJECT PREVIOUS POSITION TO (X1,Y1);
INITIALIZE THE MOVEMENT FEEDBACK BETWEEN POINT (X0,Y0) and (X1,Y1) to 0;
DISPLAY MOVEMENT FEEDBACK UNDER THE CURRENT CURSOR POSITION (X1,Y1);
REPEAT
    READ CURRENT CURSOR POSITION (X2,Y2);
    IF (X1 <> x2) OR (Y1 <> Y2) THEN
    BEGIN
       ERASE THE PREVIOUS MOVEMENT_FEEDBACK UNDER (X1,Y1);
       SET MOVEMENT_FEEDBACK = THE DISTANCE BETWEEN POINT (X0,Y0) AND (X2,Y2);
       DISPLAY THE CURRENT MOVEMENT_FEEDBACK UNDER (X2,Y2);
       SET THE OBJECT PREVIOUS POSITION (X1,Y1) = (X2,Y2);
    END;
UNTIL MOVE ACTION COMPLETE;

Object Rotation
---
INITIALIZE THE CENTER OF THE OBJECT AS (X0,Y0);
INITIALIZE THE HANDLE POSITION AS (X1,Y1);
INITIALIZE THE PREVIOUS ROTATION_FEEDBACK TO 0;
DISPLAY ROTATION_FEEDBACK UNDER THE CURRENT CURSOR POSITION (X1,Y1);
REPEAT
    READ CURRENT POINTING CURSOR POSITION (X2,Y2);
    SET ROTATION TO THE ANGLE BETWEEN LINE (X0,Y0) −
       (X1,Y1) AND LINE (X0,Y0) − (X2,Y2);
    IF ROTATION <> THEN
    BEGIN
       ERASE THE ROTATION_FEEDBACK UNDER (X1,Y1);

-continued

Object Rotation
---
       INCREMENT ROTATION_FEEDBACK BY THE AMOUNT OF ROTATION;
       DISPLAY THE ROTATION_FEEDBACK UNDER (X2,Y2);
       SET (X1,Y1) = (X2,Y2);
    END;
UNTIL ROTATE ACTION COMPLETE;

In summary, a unique method of, and system for, accurately positioning an object on a screen are provided in order to obtain a desired layout. Object representations are called or built and moved relative to one another and/or the screen itself. Positioning of an object is accurately attained by selecting the object and causing a selector such as a cursor to be displayed attached to the object, and causing a readout to appear adjacent the selector for providing an operator with a indication of the extent of movement of the object on the screen.

While the invention has been particularly shown and described with reference to a preferred embodiment, it will be understood by those skilled in the art that various changes in form and detail may be made without departing from the spirit and scope of the invention.

We claim:

1. A method of facilitating precise rotational and translational positioning of an object representation on a display screen, said method comprising:
selecting said object representation displayed on said display screen;
displaying a single numerical readout of the relative movement of said object representation adjacent said object representation during movement of said object representation whereby said numerical readout dynamically changes in response to said movement; and
moving said object representation from a first position on said display screen to a second position on said screen whereby said step of displaying causes said numerical readout to move along with said displayed object representation.

2. A method according to claim 1 including selecting a mode for moving said object representation.

3. A method according to claim 2 including selecting said object representation upon bringing a cursor coincident with said object representation.

4. A method according to claim 2 including displaying said extent of movement adjacent said cursor.

5. A method according to claim 4 wherein selecting a mode includes selecting a translation mode.

6. A method according to claim 4 wherein selecting a mode includes selecting a rotate mode.

7. A method according to claim 1 including tying said display of said extent of movement to said object representation.

8. A system for facilitating precise rotational and translational positioning of an object representation on a display screen, said system comprising:
(a) means for selecting said object representation being displayed on said display screen;
(b) means for moving said object representation from a first position on said display screen to a second position on said display screen; and
(c) means for causing a display of a numerical readout of the relative movement of said object representation adjacent said object representation during movement of said object representation such that said numerical readout moves along with the displayed object representation.

* * * * *